(12) United States Patent
AlYami et al.

(10) Patent No.: US 12,497,552 B2
(45) Date of Patent: Dec. 16, 2025

(54) CEMENT COMPOSITIONS INCLUDING VOLCANIC ASH

(71) Applicant: Saudi Arabian Oil Company, Dhahran (SA)

(72) Inventors: Noktan Mohammed AlYami, Dammam (SA); Ali Al-Safran, Dhahran (SA); Vikrant Wagle, Dhahran (SA); Abdullah Saleh Hussain Al-Yami, Dhahran (SA); Thomas Heinold, Dhahran (SA); Khawlah Alanqari, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/480,888

(22) Filed: Oct. 4, 2023

(65) Prior Publication Data

US 2025/0115801 A1     Apr. 10, 2025

(51) Int. Cl.
*C09K 8/467*     (2006.01)
*C04B 14/04*     (2006.01)
(Continued)

(52) U.S. Cl.
CPC ............ *C09K 8/467* (2013.01); *C04B 14/045* (2013.01); *C04B 14/104* (2013.01); *C04B 28/04* (2013.01); *C04B 40/0071* (2013.01); *C04B 40/0082* (2013.01); *E21B 33/14* (2013.01); *C04B 2103/0027* (2013.01); *C04B 2103/20* (2013.01); *C04B 2103/46* (2013.01); *C04B 2103/50* (2013.01); *C04B 2201/20* (2013.01); *C04B 2201/52* (2013.01)

(58) Field of Classification Search
CPC ..... C09K 8/467; C04B 14/045; C04B 14/104; C04B 28/04; C04B 40/0071; C04B 40/0082; C04B 2103/0027; C04B 2103/20; C04B 2103/46; C04B 2103/50; C04B 2201/20; C04B 2201/52; E21B 33/14

See application file for complete search history.

(56) References Cited

U.S. PATENT DOCUMENTS 7,794,537 B2    9/2010  Barlet-Gouedard et al.
7,846,250 B2    12/2010 Barlet-Gouedard et al.
(Continued)

FOREIGN PATENT DOCUMENTS

WO    WO 2017098482 A1    6/2017
WO    WO 2020086304 A1    4/2020
WO    WO 2021188154 A1    9/2021

OTHER PUBLICATIONS

Kupwade-Patil, K., Chin, S., Ilavsky, J. et al. "Hydration kinetics and morphology of cement pastes with pozzolanic volcanic ash studied via synchrotron-based techniques". Journal of Material Science, Kluwer Academic Publishers, Dordrecht, vol. 53, No. 3, 1743-1757 (2018). (Year: 2018).*

(Continued)

Primary Examiner — Crystal J Lee
(74) Attorney, Agent, or Firm — Fish & Richardson P.C.

(57) ABSTRACT

The present disclosure relates to cement compositions including Portland cement and volcanic ash. An exemplary cement composition includes about 10 wt % to about 85 wt % of Portland cement, and about 10% by weight of cement (BWOC) to about 70% BWOC of volcanic ash.

27 Claims, 11 Drawing Sheets

(51) Int. Cl.
*C04B 14/10* (2006.01)
*C04B 28/04* (2006.01)
*C04B 40/00* (2006.01)
*C04B 103/00* (2006.01)
*C04B 103/20* (2006.01)
*C04B 103/46* (2006.01)
*C04B 103/50* (2006.01)
*E21B 33/14* (2006.01)

(56) References Cited

U.S. PATENT DOCUMENTS

| | | | |
|---|---|---|---|
| 9,222,010 B2 | 12/2015 | Porcherie et al. | |
| 9,321,687 B2 | 4/2016 | Gupta et al. | |
| 9,394,202 B2 | 7/2016 | Porcherie et al. | |
| 9,890,082 B2 | 2/2018 | Dubey | |
| 10,017,418 B2 | 7/2018 | Thomas et al. | |
| 10,112,869 B2 | 10/2018 | Agapiou | |
| 10,113,389 B2 | 10/2018 | Pandey et al. | |
| 11,066,899 B1* | 7/2021 | Alanqari | C09K 8/426 |
| 11,472,741 B2 | 10/2022 | Sampson | |
| 2006/0041060 A1* | 2/2006 | George | C09K 8/46 |
| | | | 524/3 |
| 2007/0125272 A1 | 6/2007 | Johnson | |
| 2009/0200029 A1 | 8/2009 | Roddy et al. | |
| 2017/0002257 A1* | 1/2017 | Pisklak | C04B 28/34 |
| 2020/0131425 A1* | 4/2020 | Alsaihati | C04B 28/021 |
| 2023/0002276 A1 | 1/2023 | Mitchell et al. | |
| 2023/0138857 A1* | 5/2023 | Singh | C04B 18/146 |
| | | | 166/292 |

OTHER PUBLICATIONS

[No Author Listed], "Standard Specification for Coal Fly Ash and Raw or Calcined Natural Pozzolan for Use in Concrete—ASTM C618-22," Feb. 2003, Annual Book of ASTM Standards, vol. 4, 2nd Edition, 3 pages.

Leroy et al., "Valorization of Pozzolans as Partial Additive of Portland Cement: A Case of Pozzolans from the Localities of Foumbot, Penja and Tombel (Cameroon)," Journal of Minerals and Materials Characterization and Engineering, Jan. 2019, 16 pages.

International Search Report and Written Opinion in International Appln. No. PCT/US2024/049596, dated Jan. 16, 2025, 16 pages.

* cited by examiner

CEMENT COMPOSITIONS INCLUDING VOLCANIC ASH

TECHNICAL FIELD

The present disclosure relates to cement compositions including Portland cement and volcanic ash.

BACKGROUND

During the primary well cementing process, a cement slurry is typically pumped into the annulus between the rock formations of the wellbore and the steel casing in order to provide an impermeable seal and achieve zonal isolation. Complete and durable zonal isolation, or preventing the flow of fluids between zones in the well, is the foremost goal of cementing. The quality of the cement work has a direct impact on well production and performance over the life of the well.

Cement clinker, an intermediate product in the manufacture of Portland cement, is formed by reacting calcium carbonate with silica-bearing minerals in a cement kiln. However, cement kilns require significant amounts of energy, and are a major source of greenhouse gas emissions. Accordingly, cement compositions including significant amounts of Portland cement carry increased costs and contribute to global greenhouse gas emissions.

Thus, there is a need for cement compositions, such as pumpable cement compositions, having reduced Portland cement content.

SUMMARY

Provided in the present disclosure is a cement composition including about 10 wt % to about 85 wt % of Portland cement, and about 10% by weight of cement (BWOC) to about 70% BWOC of volcanic ash.

Also provided in the present disclosure is a cement composition including about 10 wt % to about 60 wt % of Portland cement, about 10% BWOC to about 70% BWOC of volcanic ash, about 0.01% BWOC to about 2% BWOC of a defoamer, about 0.1% BWOC to about 5% BWOC of a gelling agent, about 0.1% BWOC to about 3% BWOC of a retarder, and about 25 wt % to about 80 wt % of water.

Also provided in the present disclosure is a cement composition including about 10 wt % to about 60 wt % of Portland cement, about 10% BWOC to about 70% BWOC of volcanic ash, about 5% BWOC to about 20% BWOC of an extender, about 0.01% BWOC to about 2% BWOC of a defoamer, and about 25 wt % to about 80 wt % of water.

Also provided in the present disclosure is a method of cementing a wellbore. The method including providing a cement composition of the present disclosure to the wellbore, and curing the composition.

DETAILED DESCRIPTION

Figure 1:
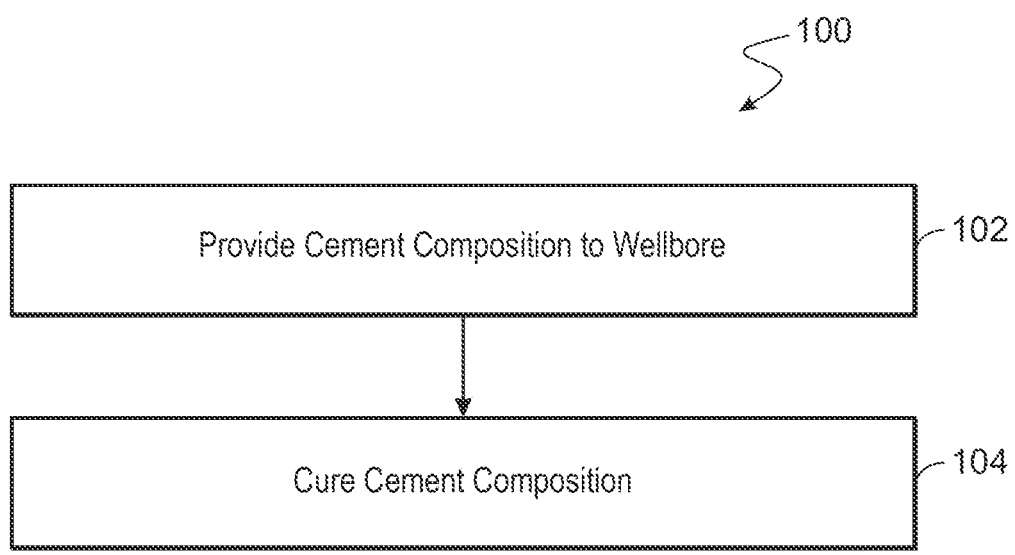
FIG. 1 is a process flow diagram of a method for cementing a wellbore.
Figure 2:
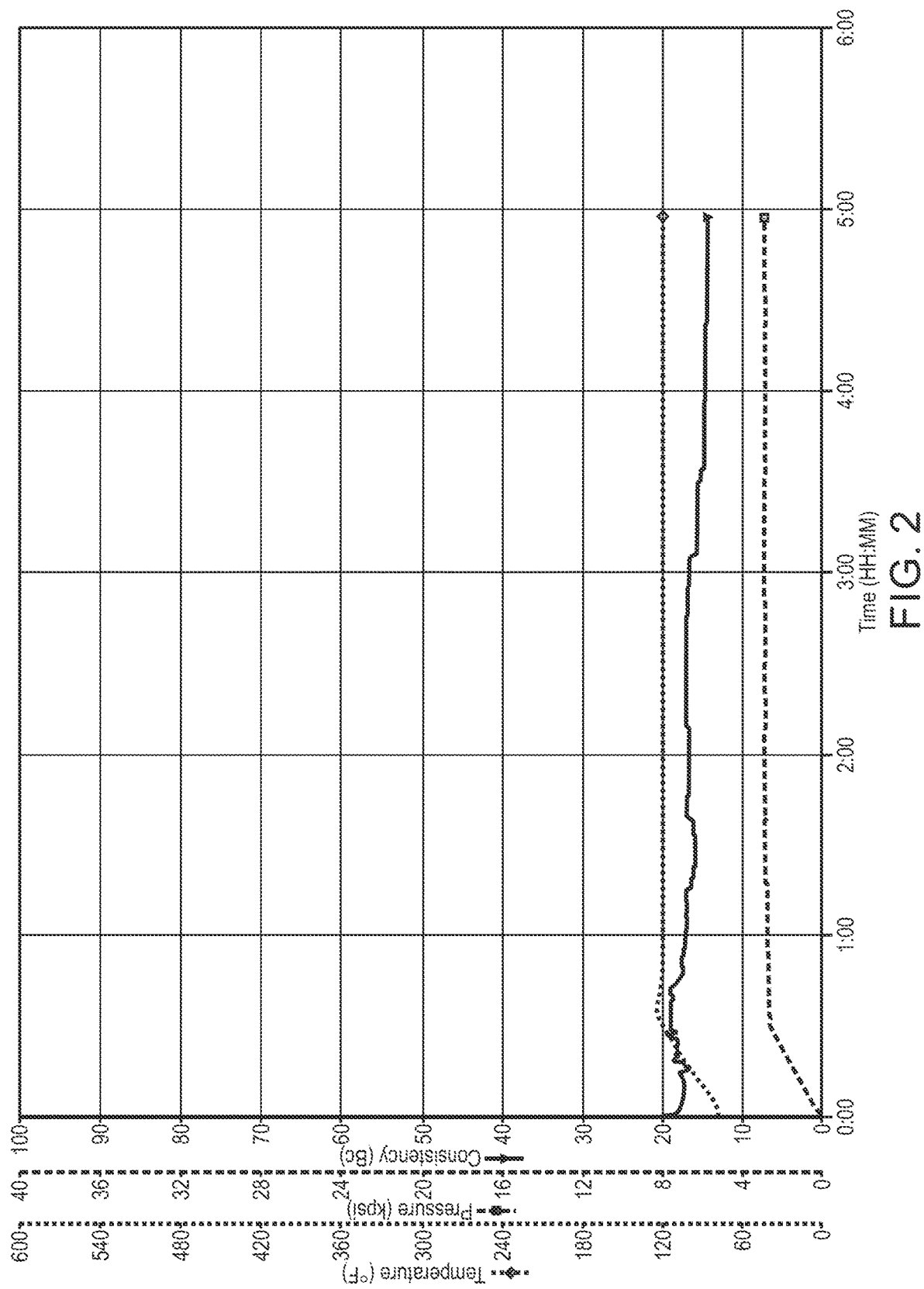
FIG. 2 is a plot showing the thickening time results of a cement composition according to an embodiment of the present disclosure.
Figure 3:
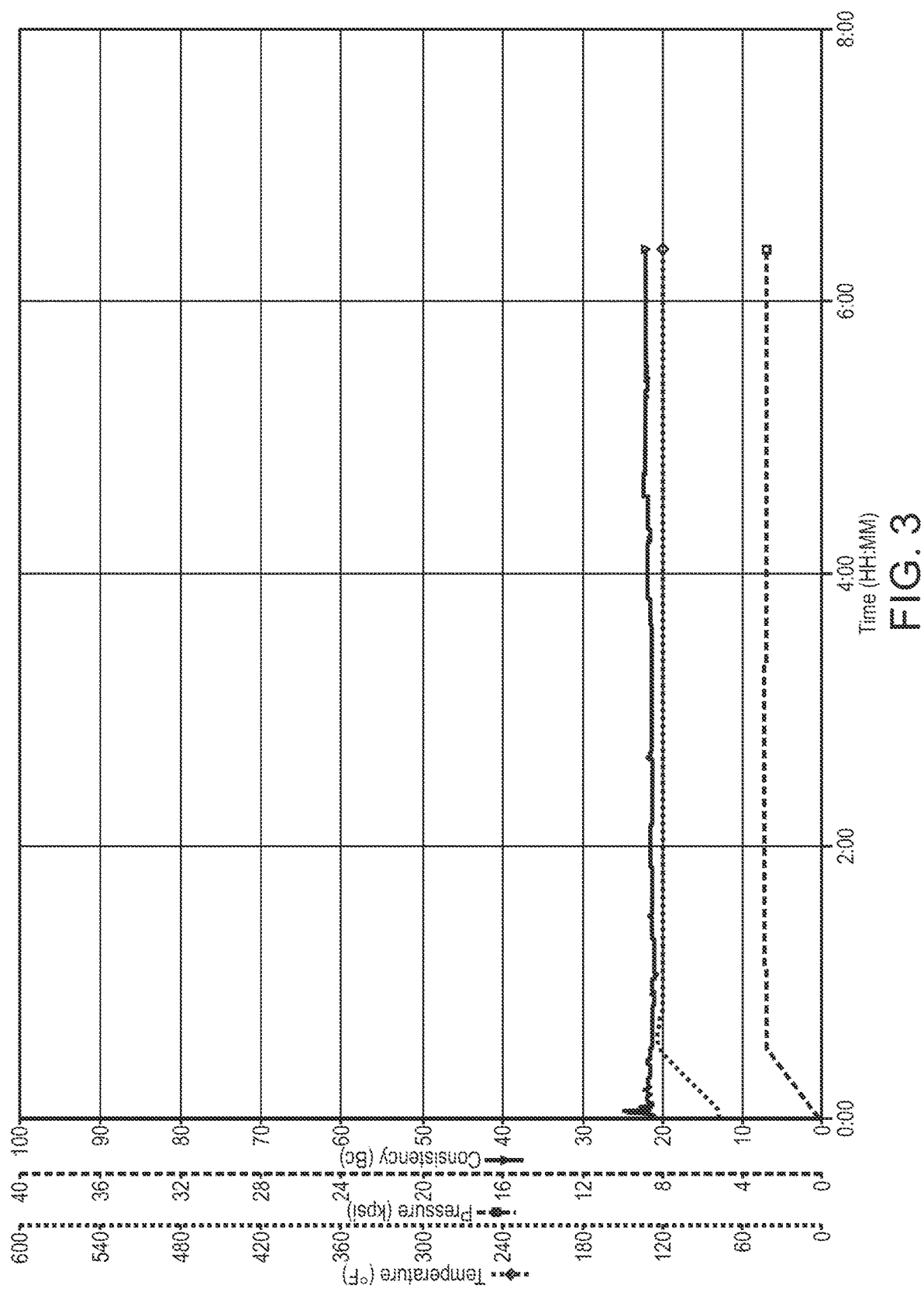
FIG. 3 is a plot showing the thickening time results of a cement composition according to an embodiment of the present disclosure.
Figure 4:
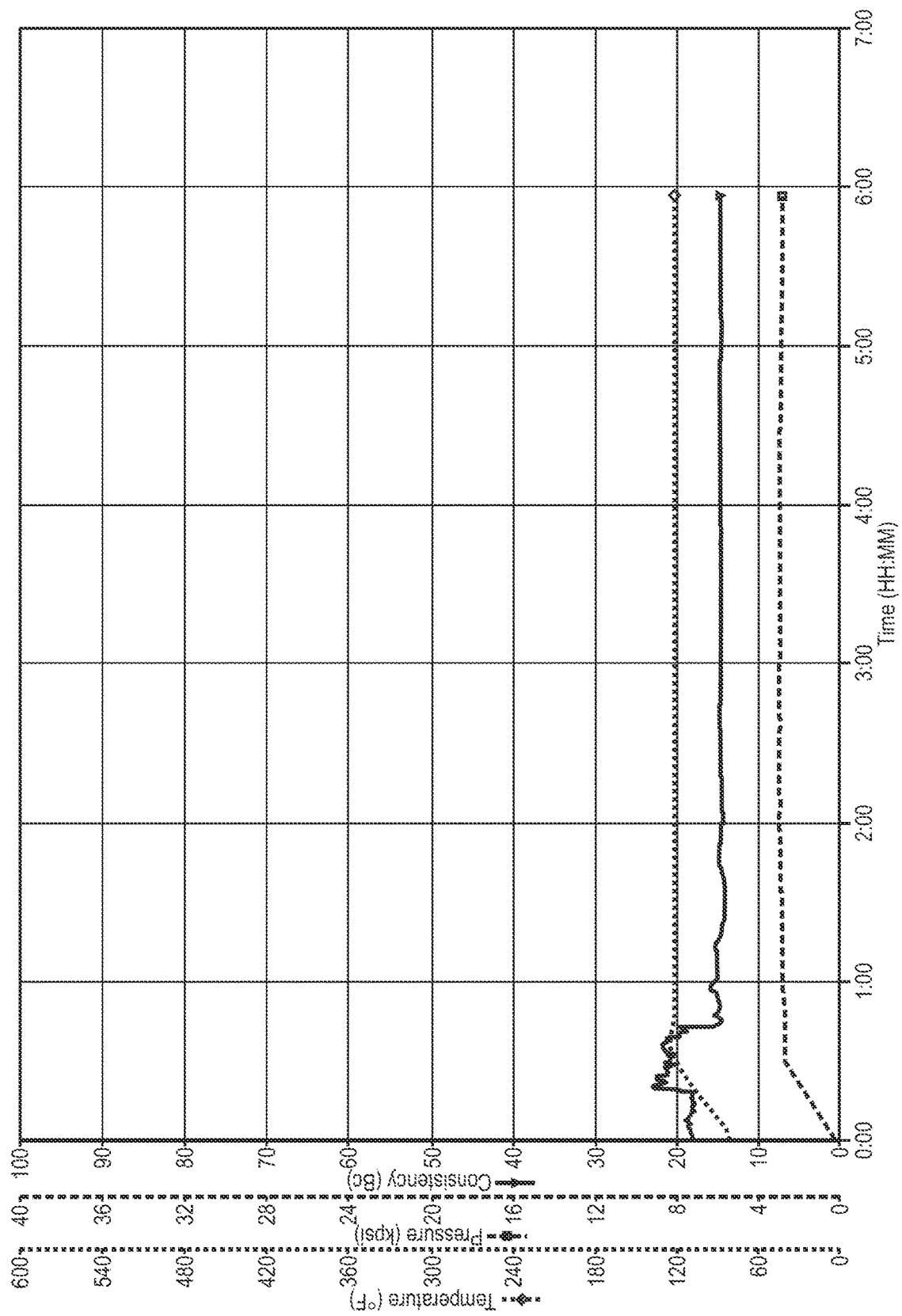
FIG. 4 is a plot showing the thickening time results of a cement composition according to an embodiment of the present disclosure.
Figure 5:
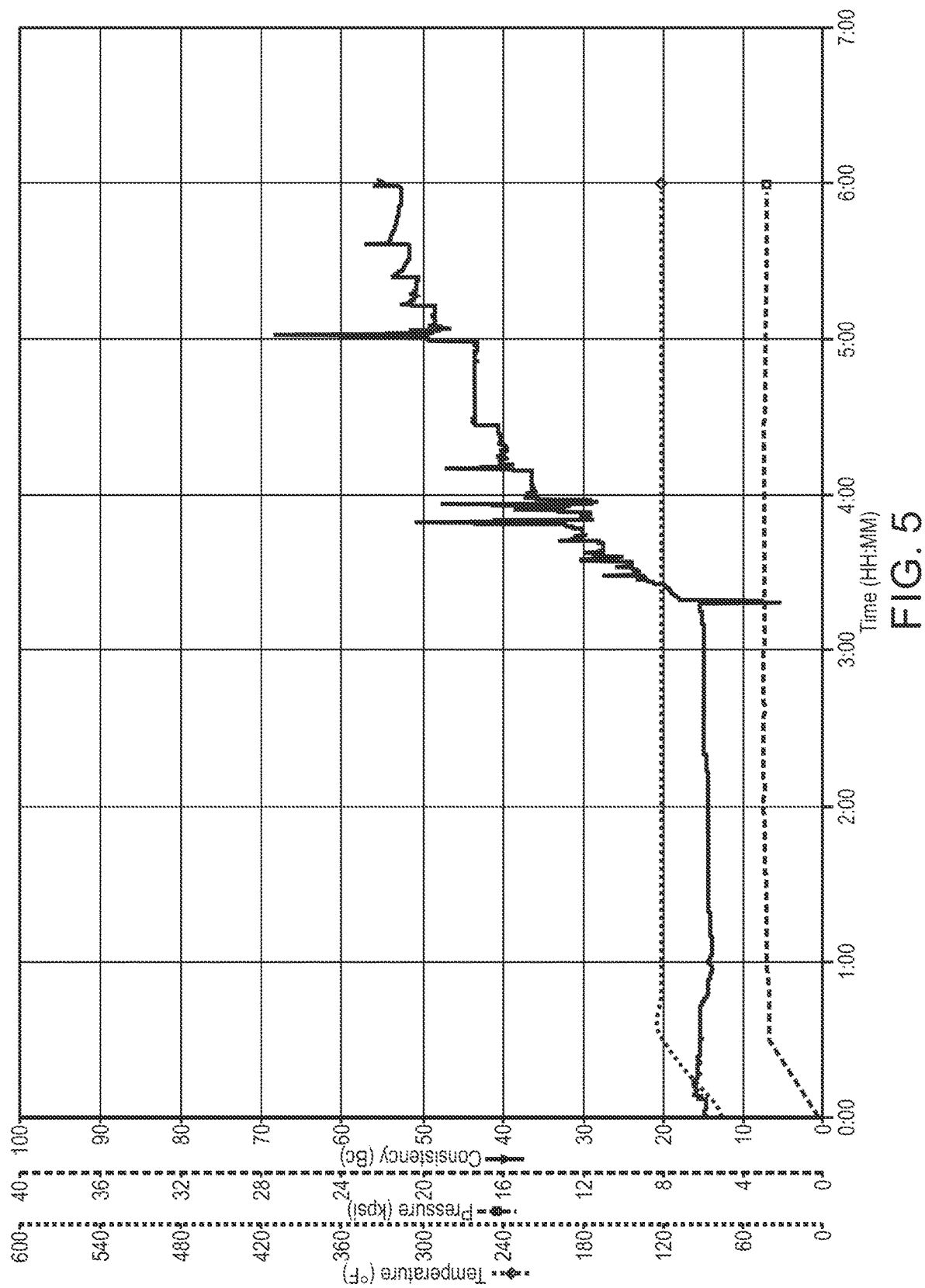
FIG. 5 is a plot showing the thickening time results of a cement composition according to an embodiment of the present disclosure.
Figure 6:
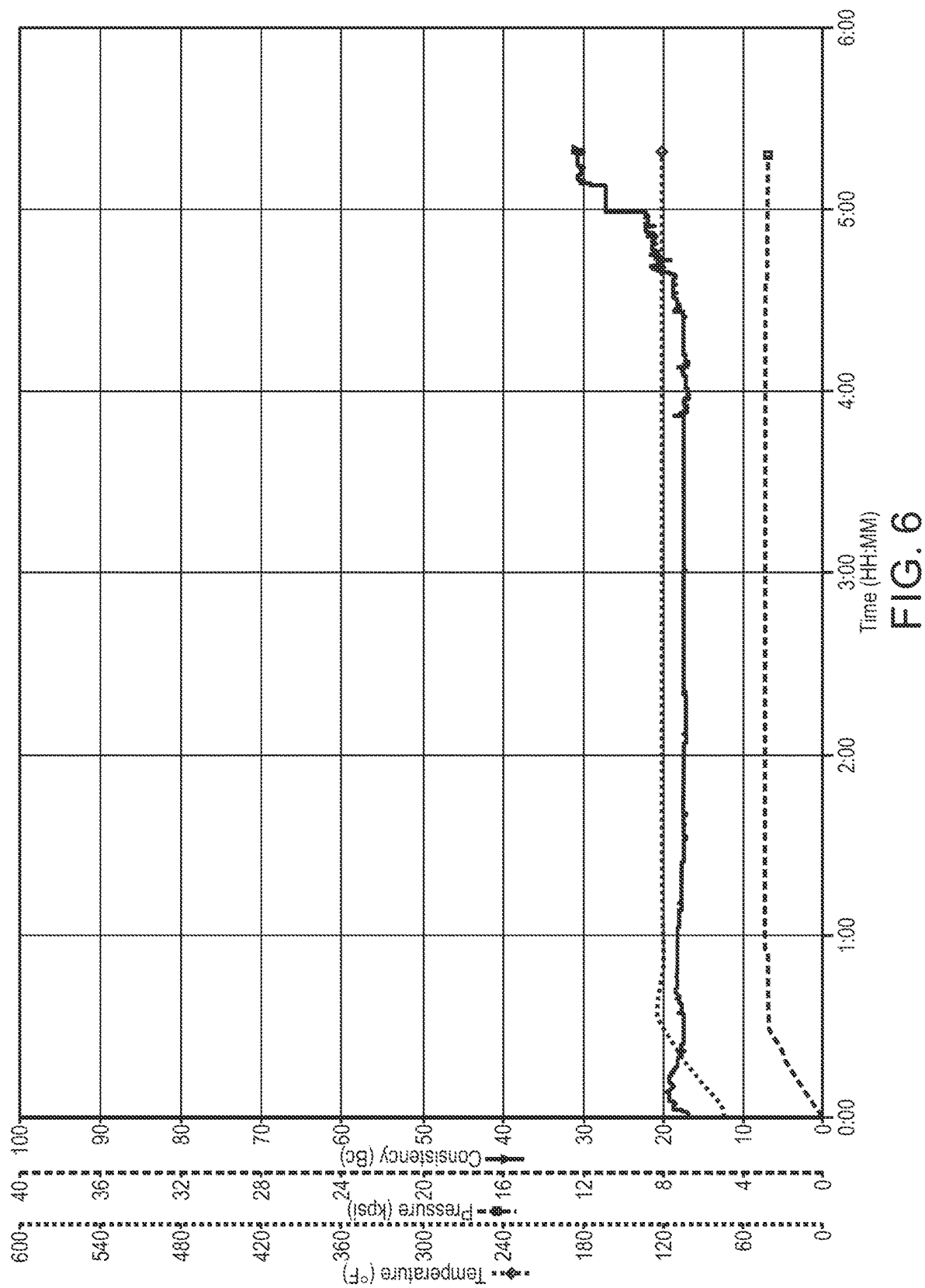
FIG. 6 is a plot showing the thickening time results of a cement composition according to an embodiment of the present disclosure.
Figure 7:
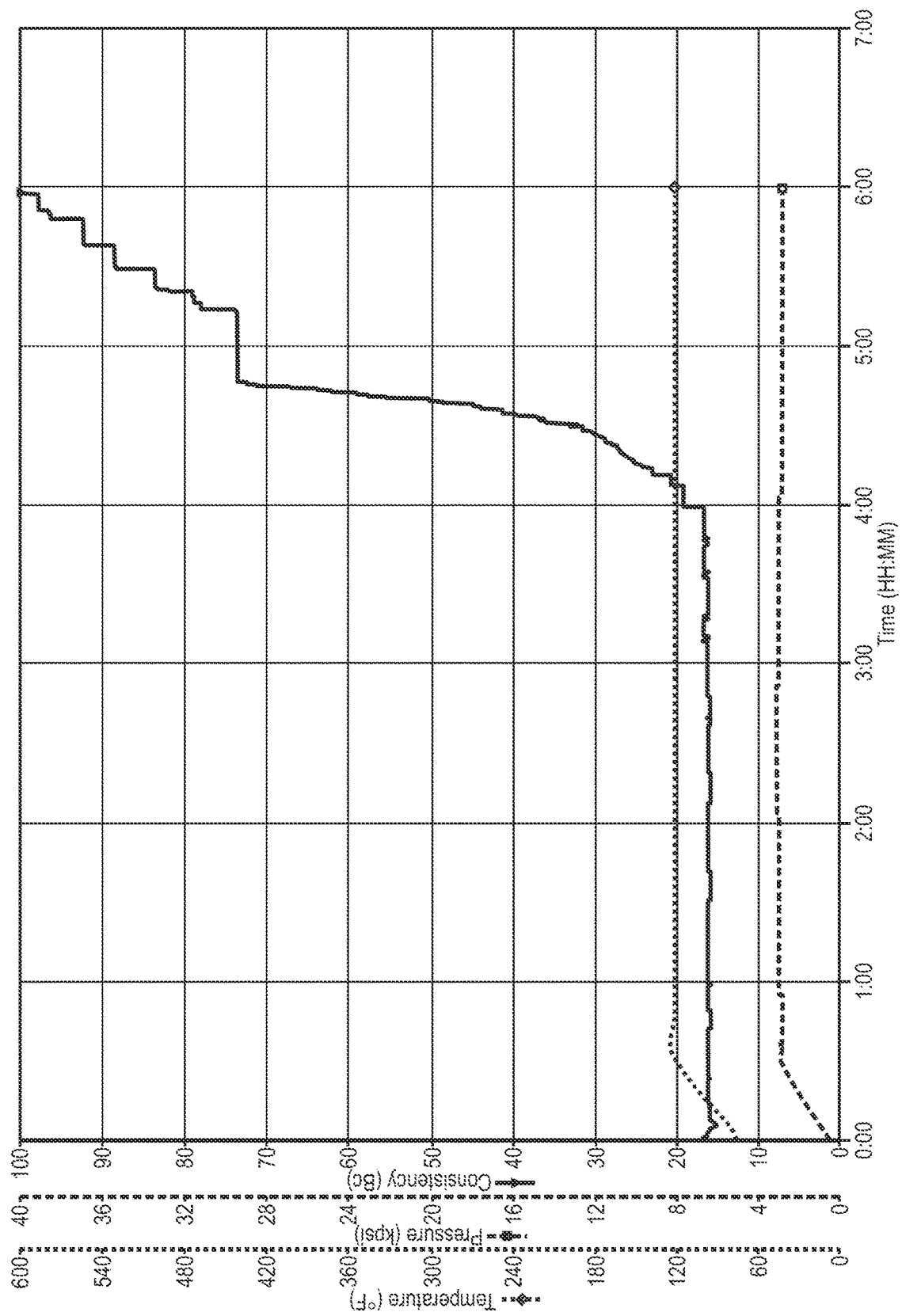
FIG. 7 is a plot showing the thickening time results of a cement composition according to an embodiment of the present disclosure.
Figure 8:
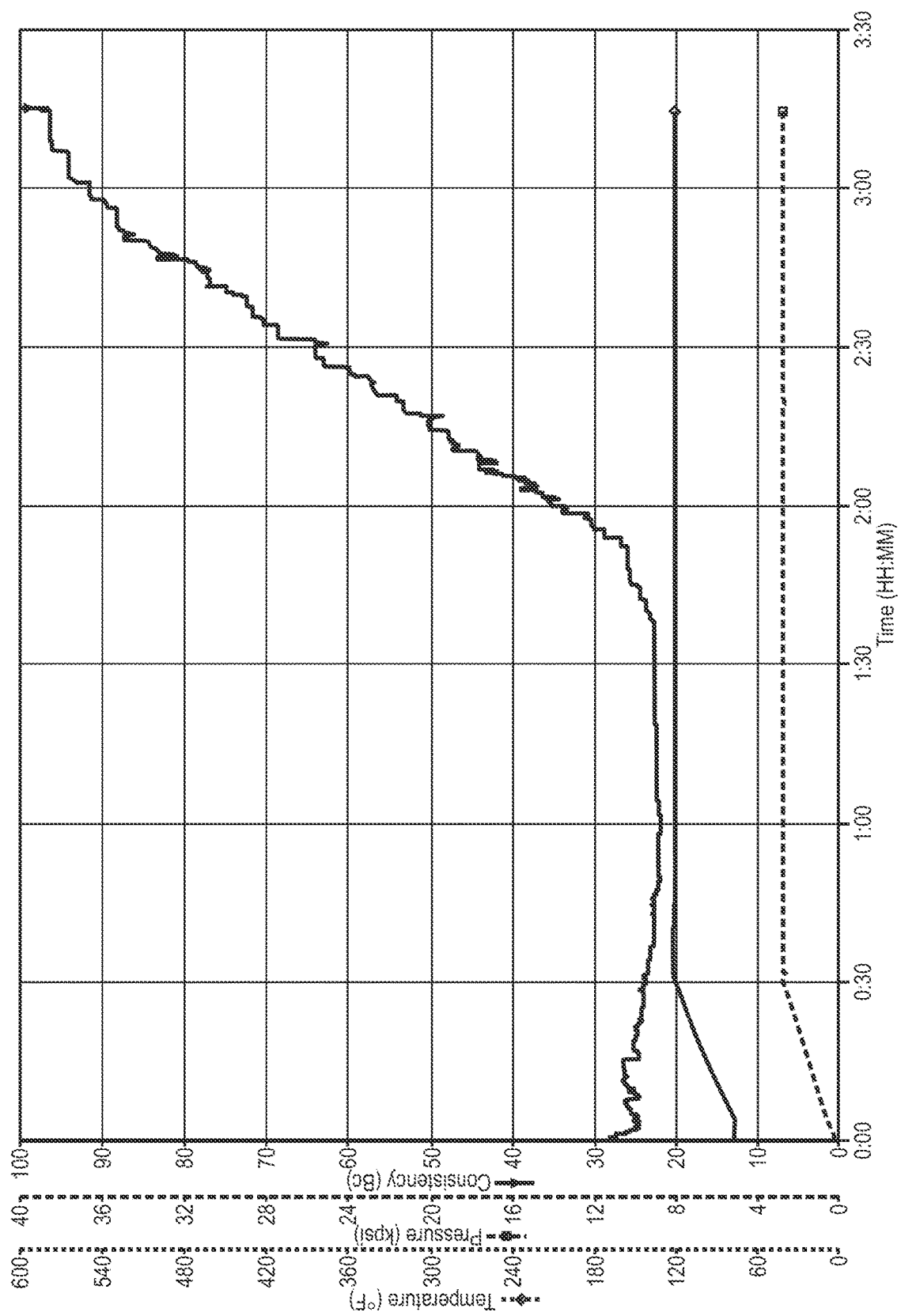
FIG. 8 is a plot showing the thickening time results of a cement composition according to an embodiment of the present disclosure.

The present disclosure relates to cement compositions including Portland cement and volcanic ash. Inclusion of the volcanic ash can reduce the amount of Portland cement necessary to provide a cement composition suitable, for example, for shallow-section applications in oil and gas wells. Such compositions can have reduced costs and reduced environmental impact compared to corresponding compositions lacking the volcanic ash. In some embodiments, cement compositions including Portland cement, volcanic ash, and water can have low densities. In some embodiments, the cement compositions have substantially no free fluid. In some embodiments, the cement compositions have rheological properties and thickening times suitable for pumping, and, upon curing, have high compressive strengths.

Cement Compositions

Provided in the present disclosure are cement compositions including about 10 wt % to about 85 wt % of Portland cement, and about 10% by weight of cement (BWOC) to about 70% BWOC of volcanic ash. In some embodiments, the volcanic ash includes Saudi Arabian volcanic ash. In other embodiments, the volcanic ash includes Italian, German, Greek, or Chinese volcanic ash. In some embodiments, the volcanic ash conforms to ASTM C618-22, "Standard Specification for Coal Fly Ash and Raw or Calcined Natural Pozzolan for Use in Concrete."

In some embodiments, the volcanic ash includes at least about 70 wt % of silicon dioxide, for example, about 75 wt % of silicon dioxide. In some embodiments, the volcanic ash includes less than about 4 wt % of sulfur trioxide, for example, about 0.2 wt % of sulfur trioxide. In some embodiments, the volcanic ash further includes about 1 wt % to about 10 wt % of magnesium oxide, for example, about 4 wt % of magnesium oxide. In some embodiments, the volcanic ash further includes about 2 wt % to about 20 wt % of calcium oxide, for example, about 9 wt % of calcium oxide.

In some embodiments, the moisture content of the volcanic ash is less than about 3 wt %, for example, about 0.2 wt %. In some embodiments, the loss on ignition of the volcanic ash is less than about 10 wt %, for example, about 0.7 wt %. In some embodiments, less than 34 wt % of the volcanic ash, for example about 15 wt % to about 16 wt % of the volcanic ash, is retained on a 45 micron screen by wet-sieving. In some embodiments, the strength activity index of the volcanic ash is at least about 75%, for example, about 92%.

In some embodiments, the cement composition includes about 10% BWOC to about 60% BWOC, about 10% BWOC to about 50% BWOC, about 20% BWOC to about 70% BWOC, about 20% BWOC to about 60% BWOC, about 20% BWOC to about 50% BWOC, about 30% BWOC to about 70% BWOC, about 30% BWOC to about 60% BWOC, or about 30% BWOC to about 50% BWOC of volcanic ash. In some embodiments, the cement composition includes about 30% BWOC, about 35% BWOC, about 40% BWOC, about 45% BWOC, or about 50% BWOC of volcanic ash.

In some embodiments, the Portland cement includes an American Society for Testing and Materials (ASTM) Type I, II, III, or V cement, or an American Petroleum Institute (API) Class A, B, C, D, G, H, K, or L cement. In some embodiments, the Portland cement includes an API Class G cement. For example, in some embodiments, the Portland cement includes a Saudi Class G cement. In some embodiments, the Portland cement includes an ordinary (O) Portland cement, a moderate sulfate resistant (MSR) Portland cement, or a high sulfate resistant (HSR) Portland cement. In some embodiments, the cement composition includes about 10 wt % to about 60 wt %, about 10 wt % to about 45 wt %, about 15 wt % to about 85 wt %, about 15 wt % to about 60 wt %, about 15 wt % to about 45 wt %, about 20 wt % to about 85 wt %, about 20 wt % to about 60 wt %, or about 20 wt % to about 45 wt % of Portland cement. In some embodiments, the cement composition includes about 20 wt %, about 22.5 wt %, about 25 wt %, about 27.5 wt %, about 30 wt %, about 32.5 wt %, about 35 wt %, about 37.5 wt %, or about 40 wt % of Portland cement.

The cement composition can be in the form of a slurry. For example, in some embodiments, the cement composition includes about 20 wt % to about 80 wt % of water, for example about 20 wt % to about 70 wt %, about 20 wt % to about 65 wt %, about 30 wt % to about 80 wt %, about 30 wt % to about 70 wt %, about 30 wt % to about 65 wt %, about 35 wt % to about 80 wt %, about 35 wt % to about 70 wt %, or about 35 wt % to about 65 wt % of water. In some embodiments, the cement composition includes about 30 wt %, about 35 wt %, about 40 wt %, about 45 wt %, about 50 wt %, about 55 wt %, about 60 wt %, or about 65 wt % of water.

In some embodiments, the cement composition includes about 10 wt % to about 60 wt % of Portland cement, about 10% BWOC to about 70% BWOC of volcanic ash, and about 25 wt % to about 80 wt % of water. In some embodiments, the cement composition includes about 15 wt % to about 45 wt % of Portland cement, about 10% BWOC to about 70% BWOC of volcanic ash, and about 35 wt % to about 65 wt % of water. In some embodiments, the cement composition includes about 27.5 wt % of Portland cement, about 40% BWOC of volcanic ash, and about 60 wt % of water. In some embodiments, the cement composition includes about 35 wt % of Portland cement, about 40% BWOC of volcanic ash, and about 50 wt % of water. In some embodiments, the cement composition includes about 35 wt % of cement, about 40% BWOC of volcanic ash, and about 45 wt % of water. In some embodiments, the cement composition includes about 45 wt % of Portland cement, about 40% BWOC of volcanic ash, and about 35 wt % of water.

In some embodiments, a weight ratio of water to a total amount of Portland cement and volcanic ash present in the composition is about 0.1:1 to about 4:1, for example, about 0.1:1 to about 3:1, about 0.1:1 to about 2:1, about 0.4:1 to about 4:1, about 0.4:1 to about 3:1, about 0.4:1 to about 2:1, about 0.8:1 to about 4:1, about 0.8:1 to about 3:1, or about 0.8:1 to about 2:1. In some embodiments, a weight ratio of water to a total amount of Portland cement and volcanic ash present in the composition is about 0.4:1, about 0.6:1, about 0.8:1, about 1:1, about 1.2:1, about 1.4:1, about 1.6:1, or about 1.8:1.

In some embodiments, the cement composition further includes an extender. Exemplary extenders include clays such as bentonite and attapulgite, sodium silicates, and lightweight particles such as expanded perlite and gilsonite. In some embodiments, the extender includes bentonite. In some embodiments, the extender includes liquid sodium silicate. In some embodiments, the cement composition includes about 0.1% BWOC to about 20% BWOC, about 0.1% BWOC to about 12 BWOC, about 0.1% BWOC to about 5% BWOC, about 0.5% BWOC to about 20% BWOC, about 0.5% BWOC to about 12% BWOC, about 0.5% BWOC to about 5% BWOC, about 0.75% BWOC to about 20% BWOC, about 0.5% BWOC to about 12% BWOC, or about 0.75% BWOC to about 5% BWOC of the extender. In some embodiments, the cement composition includes about 0.5% BWOC, about 1% BWOC, about 1.5% BWOC, about 2% BWOC, about 6% BWOC, about 8% BWOC, about 10% BWOC, about 12% BWOC, or about 14% BWOC of the extender.

In some embodiments, the cement composition includes a defoamer. Exemplary defoamers include polyols, fatty acid esters, and ethyl hexanol. In some embodiments, the cement composition includes about 0.01% BWOC to about 2% BWOC, about 0.01% BWOC to about 1.5% BWOC, about 0.01% BWOC to about 1% BWOC, about 0.05% BWOC to about 2% BWOC, about 0.05% BWOC to about 1.5% BWOC, about 0.05% BWOC to about 1% BWOC, about 0.1% BWOC to about 2% BWOC, about 0.1% BWOC to about 1.5% BWOC, or about 0.1% BWOC to about 1% BWOC. In some embodiments, the cement composition includes about 0.2% BWOC, about 0.3% BWOC, about 0.4% BWOC, about 0.5% BWOC, or about 0.6% BWOC of the defoamer.

In some embodiments, the cement composition includes a gelling agent. Exemplary gelling agents include celluloses and derivatives thereof, polysaccharides, methyl celluloses, cellulose ethers, dilutan gums, and polyacrylamides. In some embodiments, the cement composition includes about 0.1% BWOC to about 5% BWOC, about 0.1% BWOC to about 3% BWOC, about 0.1% BWOC to about 2% BWOC, about 0.2% BWOC to about 5% BWOC, about 0.2% BWOC to about 3% BWOC, about 0.2% BWOC to about 2% BWOC, about 0.5% BWOC to about 5% BWOC, about 0.5% BWOC to about 3% BWOC, or about 0.5% BWOC to about 2% BWOC of the gelling agent. In some embodiments, the cement composition includes about 0.25% BWOC, about 0.5% BWOC, about 0.75% BWOC, about 1% BWOC, about 1.25% BWOC, or about 1.5% BWOC of the gelling agent.

In some embodiments, the cement composition includes a retarder. Exemplary retarders include high-temperature retarders such as ethylene glycol, and low-temperature retarders such as calcium lignosulfonate. In some embodiments, the retarder includes a low-temperature retarder. In some embodiments, the cement composition includes about 0.01% BWOC to about 3% BWOC, about 0.01% BWOC to about 2% BWOC, about 0.01% BWOC to about 1% BWOC, about 0.05% BWOC to about 3% BWOC, about 0.05% BWOC to about 2% BWOC, about 0.05% BWOC to about 1% BWOC, about 0.1% BWOC to about 3% BWOC, about 0.1% BWOC to about 2% BWOC, or about 0.1% BWOC to about 1% BWOC of the retarder. In some embodiments, the cement composition includes about 0.1% BWOC, about 0.15% BWOC, about 0.2% BWOC, about 0.25% BWOC, about 0.3% BWOC, or about 0.35% BWOC of the retarder.

In some embodiments, the cement composition has a density of about 60 pcf to about 150 pcf, for example, about 60 pcf to about 130 pcf, about 60 pcf to about 120 pcf, about 75 pcf to about 150 pcf, about 75 pcf to about 130 pcf, about 75 pcf to about 120 pcf, about 80 pcf to about 150 pcf, about 80 pcf to about 130 pcf, or about 80 pcf to about 120 pcf. In some embodiments, the cement composition has a density of about 80 pcf, about 85 pcf, about 90 pcf, about 95 pcf, about 100 pcf, about 105 pcf, about 100 pcf, or about 105 pcf.

In some embodiments, the cement composition has a thickening time of about 3 hours to about 8 hours at about 120° F. and about 2,700 psi, for example, about 3 hours to about 7 hours, about 3 hours to about 6 hours, about 4 hours to about 8 hours, about 4 hours to about 7 hours, about 4 hours to about 6 hours, about 5 hours to about 8 hours, about 5 hours to about 7 hours, or about 5 hours to about 6 hours at about 120° F. and about 2,700 psi. In some embodiments, the cement composition has a thickening time of about 4.5 hours, about 5 hours, about 5.5 hours, about 6 hours, about 6.5 hours, or about 7 hours at about 120° F. and about 2,700 psi.

In some embodiments, the cement composition has a compressive strength of about 50 psi to about 1,500 psi after curing for about 1 day at about 150° F., for example, about 70 psi to about 1,300 psi after curing for about 1 day at about 150° F. In some embodiments, the cement composition has a compressive strength of about 75 psi, about 300 psi, about 325 psi, about 350 psi, about 1200 psi, about 1250 psi, or about 1300 psi after curing for about 1 day at about 150° F. In some embodiments, the cement composition has a compressive strength of about 100 psi to about 2,000 psi after curing for about 3 days at about 150° F., for example, about 120 psi to about 1,700 psi after curing for about 3 days at about 150° F. In some embodiments, the cement composition has a compressive strength of about 100 psi, about 125 psi, about 350 psi, about 375 psi, about 400 psi, about 500 psi, about 525 psi, about 550 psi, about 1,625 psi, about 1,650 psi, or about 1,675 psi after curing for about 3 days at about 150° F. Compressive strength can be determined according to known methods, for example, crushing test or ultrasonic cement analysis (UCA).

In some embodiments, the cement composition includes about 10 wt % to about 60 wt % of Portland cement, about 10% BWOC to about 70% BWOC of volcanic ash, about 0.01% BWOC to about 2% BWOC of a defoamer, about 0.1% BWOC to about 5% BWOC of a gelling agent, about 0.1% BWOC to about 3% BWOC of a retarder, and about 25 wt % to about 80 wt % of water. In certain such embodiments, the cement composition includes about 15 wt % to about 45 wt % of Portland cement, and about 30 wt % to about 65 wt % of water. In certain such embodiments, the cement composition further includes about 0.1% BWOC to about 5% BWOC of an extender. In some embodiments, the extender includes bentonite.

In some embodiments, the cement composition includes about 10 wt % to about 60 wt % of Portland cement, about 10% BWOC to about 70% BWOC of volcanic ash, about 5% BWOC to about 20% BWOC of an extender, about 0.01 BWOC to about 2% BWOC of a defoamer, and about 25 wt % to about 80 wt % of water. In certain such embodiments, the extender includes sodium silicate.

Cementing Methods

Also provided in the present disclosure is a method for cementing a wellbore. The method includes providing a cement composition to the wellbore, and curing the composition. The cement composition can be any cement composition of the present disclosure. In some embodiments, providing the cement includes pumping the cement composition into an annulus between the wellbore and a casing in the wellbore. In some embodiments, the curing is passive, for example, under ambient conditions. In other embodiments, curing the cement includes providing heat or air to the cement composition, introducing a curing agent to the cement composition, or both.

FIG. 1 is a process flow diagram of a method 100 for cementing a wellbore. The method starts at block 102 with the providing of a cement composition of the present disclosure to the wellbore. At block 104 of the method, the composition is cured.

Definitions

The terms "a," "an," and "the" are used in the present disclosure to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in the present disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used in the present disclosure, the term "about" can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the present disclosure, a "cement" is a binder, for example, a substance that sets and forms a cohesive mass with measurable strengths. A cement can be characterized as non-hydraulic or hydraulic. Non-hydraulic cements (for example, Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. Hydraulic cements (for example, Portland cement) harden because of hydration, which uses only water in addition to the dry cement to achieve setting of the cement. Cement hydration products, chemical reactions that occur independently of the mixture's water content, can harden even underwater or when constantly exposed to wet weather. The chemical reaction that results when the dry cement powder is mixed with water produces hydrates that are water-soluble.

As used in the present disclosure, the term "Portland cement" refers to cements including ground Portland clinker.

As used in the present disclosure, the term "curing" refers to achieving desired properties of a cement composition (such as hardness) through one or more reactions between the components of the composition.

As used in the present disclosure, the term "Saudi Arabian volcanic ash" refers to volcanic ash originally acquired from Saudi Arabia.

As used in the present disclosure, the term "retarder" refers to compounds that delay the set time of a cement slurry.

As used in the present disclosure, the term "defoamer" can be used interchangeably with "anti-foaming agent" and refers to compounds that reduce or inhibit the formation of foam in a cement slurry.

As used in the present disclosure, the term "gelling agent" refers to compounds that increase the viscosity or suspension ability of a cement slurry.

As used in the present disclosure, the term "extender" refers to a chemical additive or inert material used to decrease the density of a cement slurry.

As used in the present disclosure, the term "thickening time" refers to the time during which a cement composition remains in a fluid state and is capable of being pumped, for example, up to about 100 Bc. Thickening time can be determined, for example, at about 120° C. and about 2,700 psi. Unless otherwise specified, thickening time values in the present disclosure are measured according to American Petroleum Institute (API) Recommended Practice 10B-2.

As used in the present disclosure, the term "fluid loss" refers generally to the loss of water from a cement slurry into materials surrounding the cement slurry. Unless otherwise specified, specific fluid loss values in the present disclosure are measured according to API Recommended Practice 10B-2.

The term "downhole," as used in the present disclosure, can refer to under the surface of the earth, such as a location within or fluidly connected to a wellbore.

As used in the present disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

EXAMPLES

Example 1. Characterization of Volcanic Ash

Saudi Arabian volcanic ash was characterized and compared to ASTM C-618. Results are shown in Table 1.

TABLE 1

Specification Comparison

| Characteristics | ASTM C-618 | Volcanic Ash |
| --- | --- | --- |
| Silicon Dioxide ($SiO_2$) + Aluminum Oxide ($Al_3O_2$) + Iron Oxide ($Fe_3O_2$), Min | 70 | 75.78 |
| Silicon Dioxide ($SiO_2$), Min % | — | 75.718 |
| Magnesium Oxide (MgO), Max % | — | 4.3 |
| Calcium Oxide (CaO), Max % | report only | 8.9 |
| Sulphur Trioxide ($SO_3$), Max % | 4.0 | 0.18 |
| Moisture Content, Max % | 3.0 | 0.2 |
| Loss on Ignition, Max % | 10.0 | 0.65 |
| Available Alkali as Sodium Oxide ($Na_2O$), Max % | — | 1.29 |
| Retained on 45 Micron in wet-sieving, Max % | 34 | 15-16% |
| Strength Activity index, % (7 Days-28 Days) | 75 min | 92 |
| Specific Gravity | — | 2.2-2.9 |
| Water Demand of Control mix, Max % | 115 | 101 |

The results demonstrate that the volcanic ash conforms to ASTM C-618.

Example 2. Preparation of Cement Compositions

Cement compositions 1-4, having densities of 85 pcf, 95 pcf, 95 pcf, and 109 pcf respectively, were prepared. Components and order of addition are provided in Tables 2-5. All four slurries were formulated with a fixed concentration of Saudi Arabian volcanic ash (40% BWOC). Bentonite was mixed with water for 20 minutes before the remaining components were added to cement composition 1. After adding viscosifier to cement compositions 1, 2, and 4, the formulation was mixed for 10 minutes before the remaining components were introduced. The total volume of each cement composition was 600 mL.

TABLE 2

Cement Composition 1 (85 pcf)-Components and Order of Addition

| Component | SG* | Conc. | Unit | Weight (g) |
|---|---|---|---|---|
| Water | 1 | 24.63 | gps | 494.13 |
| Bentonite | 2.67 | 1.5 | % BWOC | 3.38 |
| Defoamer | 0.95 | 0.05 | gps | 0.95 |
| Viscosifier | 1.37 | 1.4 | % BWOC | 3.15 |
| Low-temperature retarder | 1.26 | 0.14 | % BWOC | 0.32 |
| API Class G cement | 3.22 | 0.468 | Cf/sack | 225.09 |
| Volcanic ash | 2.89 | 40 | % BWOC | 90.04 |

*Specific gravity

TABLE 3

Cement Composition 2 (95 pcf)-Components and Order of Addition

| Component | SG | Conc. | Unit | Weight (g) |
|---|---|---|---|---|
| Water | 1 | 15.34 | gps | 448.96 |
| Defoamer | 0.95 | 0.05 | gps | 1.39 |
| Viscosifier | 1.37 | 0.7 | % BWOC | 2.3 |
| Low-temperature retarder | 1.26 | 0.14 | % BWOC | 0.46 |
| API Class G cement | 3.22 | 0.468 | Cf/sack | 328.62 |
| Volcanic ash | 2.89 | 40 | % BWOC | 131.45 |

TABLE 4

Cement Composition 3 (95 pcf)-Components and Order of Addition

| Component | SG | Conc. | Unit | Weight (g) |
|---|---|---|---|---|
| Water | 1 | 14.99 | gps | 425.95 |
| Sodium Silicate | 1.38 | 1 | gps | 39.10 |
| Defoamer | 0.95 | 0.05 | gps | 1.35 |
| API Class G cement | 3.187 | 0.472 | Cf/sack | 319.13 |
| Volcanic ash | 2.89 | 40 | % BWOC | 127.65 |

TABLE 5

Cement Composition 4 (109 pcf)-Components and Order of Addition

| Component | SG | Con c. | Unit | Weight (g) |
|---|---|---|---|---|
| Water | 1 | 9.20 | gps | 384.80 |
| Defoamer | 0.95 | 0.05 | gps | 1.98 |
| Viscosifier | 1.37 | 0.25 | % BWOC | 1.18 |
| Low-temperature retarder | 1.26 | 0.3 | % BWOC | 1.41 |
| API Class G cement | 3.22 | 0.468 | Cf/sack | 470.26 |
| Volcanic ash | 2.89 | 40 | % BWOC | 188.11 |

Example 3. Rheology and Free Fluid Test

A viscometer was used to test the rheology of cement compositions 1-4 after conditioning at 120° F. Results are shown in Table 6. Additionally, a free fluid test was conducted for each of cement compositions 1-4. As shown in Table 6, no free fluid was detected.

TABLE 6

Rheology and Free Fluid Results at 120° F.

| Cement Composition | 1 | 2 | 3 | 4 |
|---|---|---|---|---|
| Rheology Speed (rpm) | Shear rate ($s^{-1}$) | Shear rate ($s^{-1}$) | Shear rate ($s^{-1}$) | Shear rate ($s^{-1}$) |
| 300 | 97 | 96 | 52 | 120 |
| 200 | 82 | 76 | 46 | 93 |
| 100 | 58 | 51 | 39 | 61 |
| 6 | 9 | 7 | 20 | 17 |
| 3 | 5 | 4 | 15 | 14 |
| 10 sec | 6 | 3 | 18 | 14 |
| 10 min | 8 | 8 | 25 | 22 |
| Density by pressurized mud balance (pcf) | 84.5 | 95 | 95 | 108.5 |
| Free fluid in 250 mL graduated cylinder after 2 hours | 0 | 0 | 0 | 0 |

The results show that cement compositions 1-4 had rheological and free fluid properties suitable for pumping.

Example 4. Thickening Time

Cement compositions 1B, 2B, and 4B corresponding to cement compositions 1, 2, and 4, but lacking any retarder, were prepared according to Example 1.

A consistometer was used to test the thickening time of cement compositions 1, 1B, 2, 2B, 3, 4, and 4B at 120° F. and 2,700 psi, with a ramping time of 28-30 minutes. Results are shown in Tables 7-13 and FIGS. 2-8 (compositions 1, 1B, 2, 2B, 3, 4, and 4B, respectively). The results, which show the duration that the compositions remained in a fluid state, indicate that cement compositions 1-4 were capable of being pumped. All of the slurries showed a suitable thickening time of around 5-6 hours before reaching 100 Bc.

TABLE 7

Cement Composition 1-Thickening Time Results

| Test Temperature | 120° F. | Ramp Time | 30 min |
|---|---|---|---|
| Thickening Time | 5 hrs | Bc Final | 14 |
| BHCT* | 120° F. | Pressure | 2740 psi |
| Batch mixing | NA | Density | 84.5 pcf |

*Bottomhole circulating temperature

TABLE 8

Cement Composition 1B-Thickening Time Results

| Test Temperature | 120° F. | Ramp Time | 30 min |
|---|---|---|---|
| Thickening Time | 6.3 hrs | Bc Final | 22 |
| BHCT | 120° F. | Pressure | 2740 psi |
| Batch mixing | NA | Density | 85 pcf |

TABLE 9

Cement Composition 2-Thickening Time Results

| Test Temperature | 120° F. | Ramp Time | 30 min |
|---|---|---|---|
| Thickening Time | 6 hrs | Bc Final | 13 |
| BHCT | 120° F. | Pressure | 2740 psi |
| Batch mixing | NA | Density | 95 pcf |

TABLE 10

Cement Composition 2B-Thickening Time Results

| | | | |
|---|---|---|---|
| Test Temperature | 120° F. | Ramp Time | 30 min |
| Thickening Time | 6 hrs | Bc Final | 56 |
| BHCT | 120° F. | Pressure | 2740 psi |
| Batch mixing | NA | Density | 95 pcf |

TABLE 11

Cement Composition 3-Thickening Time Results

| | | | |
|---|---|---|---|
| Test Temperature | 120° F. | Ramp Time | 30 min |
| Thickening Time | 5.2 hrs | Bc Final | 30 |
| BHCT | 120° F. | Pressure | 2740 psi |
| Batch mixing | NA | Density | 95 pcf |

TABLE 12

Cement Composition 4-Thickening Time Results

| | | | |
|---|---|---|---|
| Test Temperature | 120° F. | Ramp Time | 28 min |
| Thickening Time | 6 hrs | Bc Final | 100 |
| BHCT | 120° F. | Pressure | 2740 psi |
| Batch mixing | NA | Density | 108.5 pcf |

TABLE 13

Cement Composition 4B-Thickening Time Results

| | | | |
|---|---|---|---|
| Test Temperature | 120° F. | Ramp Time | 30 min |
| Thickening Time | 3.2 hrs | Bc Final | 100 |
| BHCT | 120° F. | Pressure | 2740 psi |
| Batch mixing | NA | Density | 109 pcf |

Example 5. Compressive Strength

Figure 9:
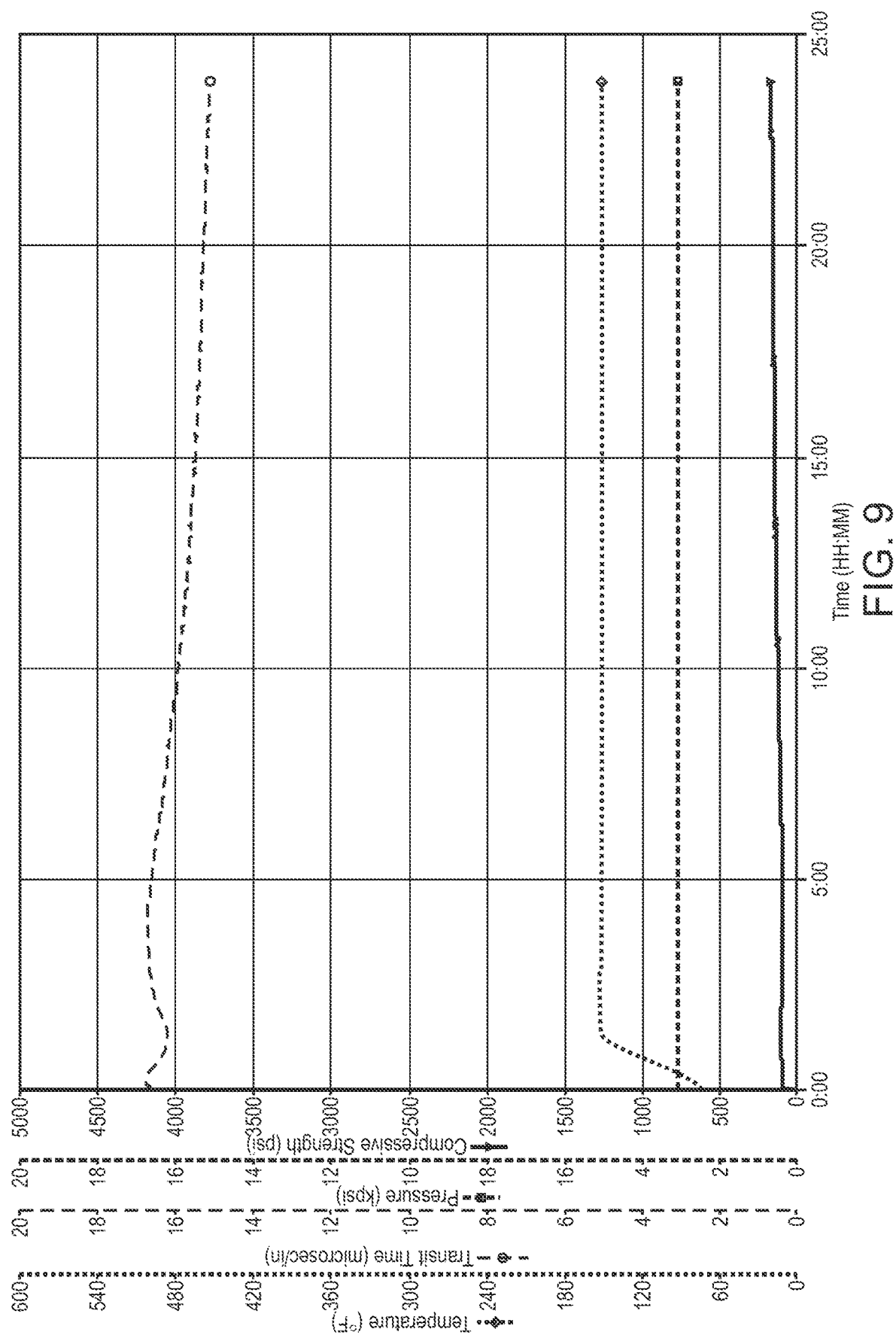
FIG. 9 is a plot showing the compressive strength test results of a cement composition according to an embodiment of the present disclosure.
Figure 10:
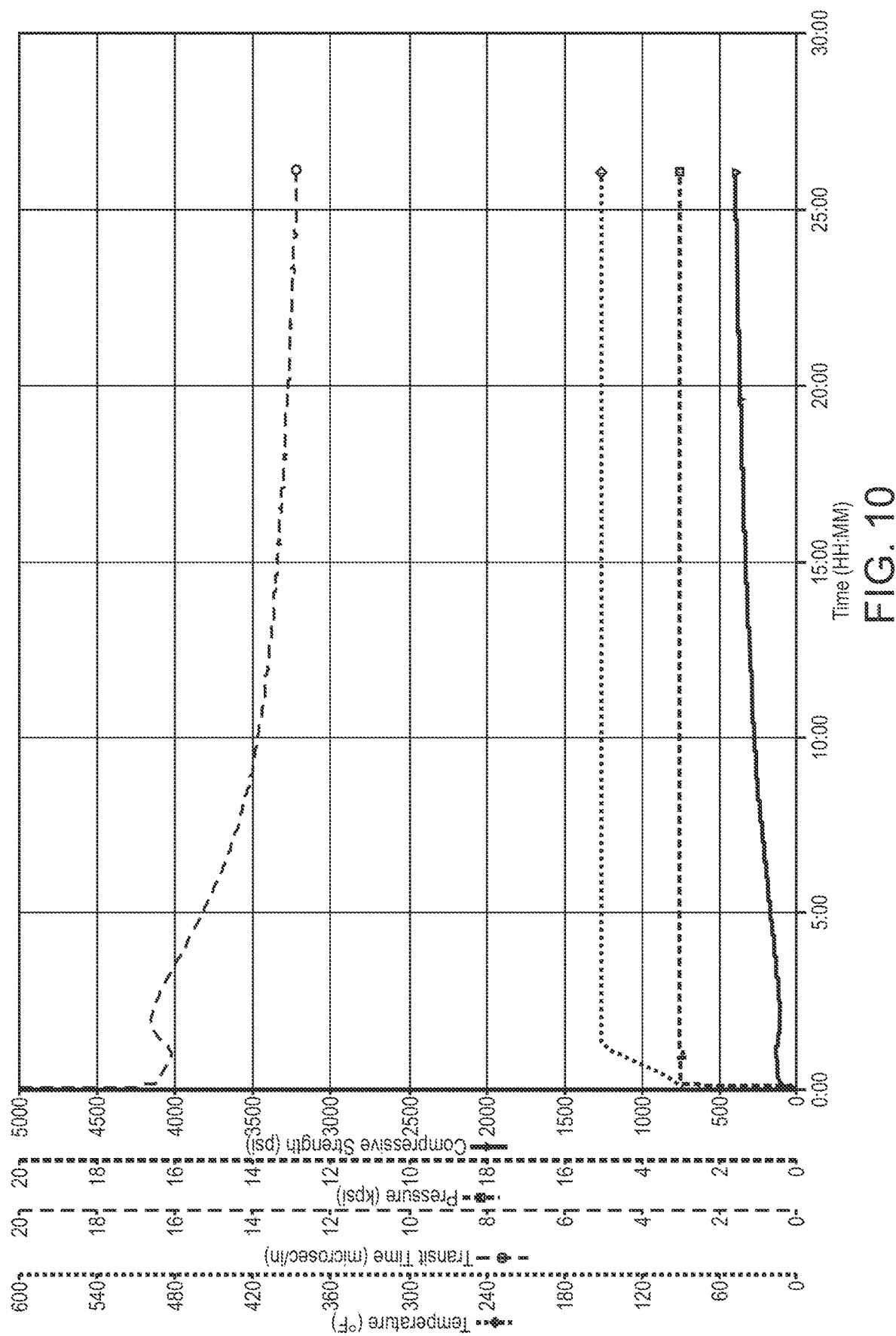
FIG. 10 is a plot showing the compressive strength test results of a cement composition according to an embodiment of the present disclosure.
Figure 11:
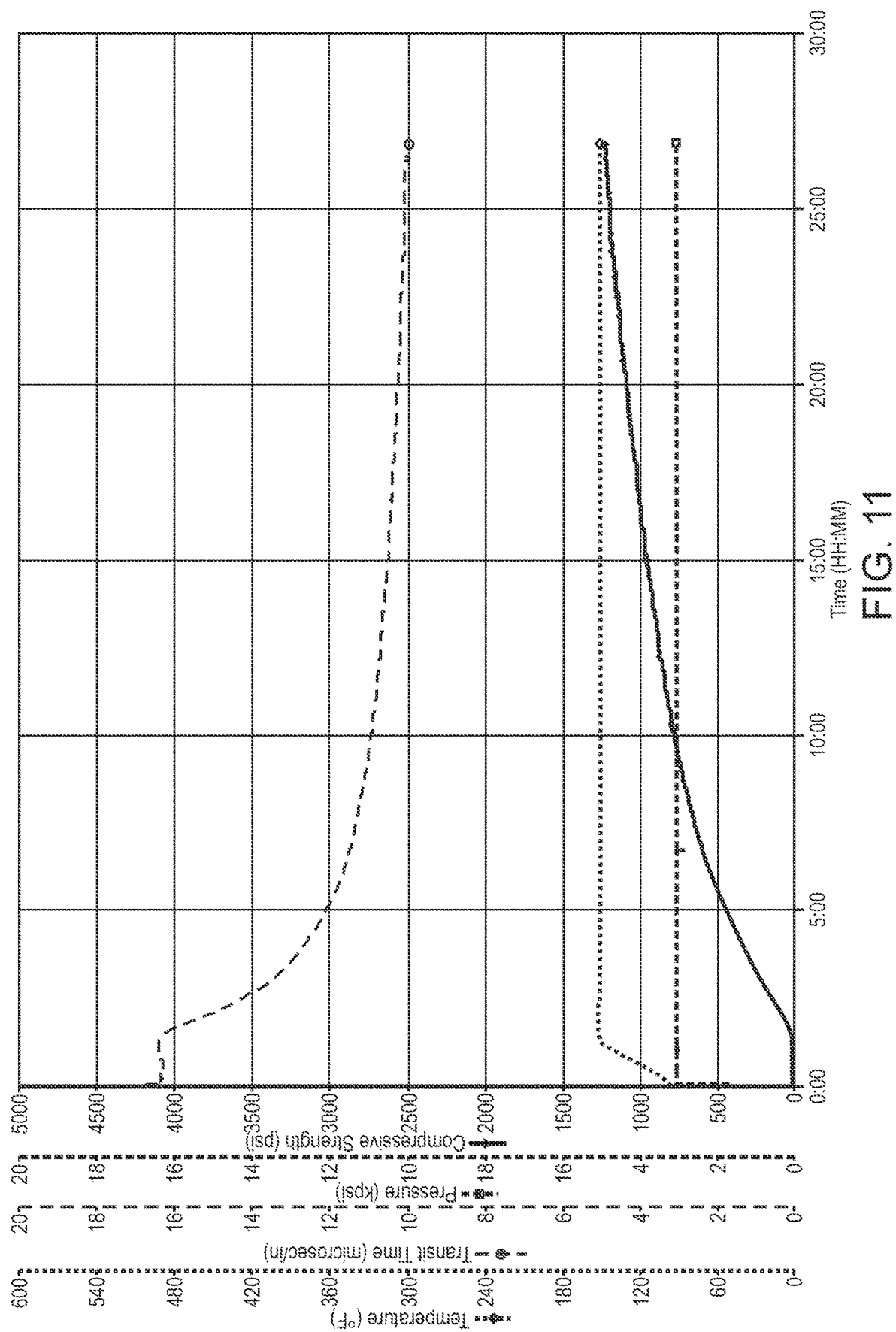
FIG. 11 is a plot showing the compressive strength test results of a cement composition according to an embodiment of the present disclosure.

Crushing strength tests were conducted on cement compositions 1B, 2B, 3, and 4B. Samples were placed in a cubic mold and kept in a water bath at 150° F. for 24 hours or 72 hours. Then the crushing strength (compressive strength) test was performed on the solid/cured cement cubes. The results, shown in Table 14, indicated that higher densities of the cement compositions corresponded to higher compressive strengths. An ultrasonic cement analyzer (UCA), a non-destructive method for determining the relative strength development of a cement sample under down-hole temperature and pressure conditions, was also used to characterize the solid/cured cement cubes. Results, shown in Table 15 and FIGS. 9-11 (cement compositions 1B, 2B, and 4B, respectively), are comparable to those obtained by the crushing test.

TABLE 14

Compressive Strength (Crushing Test)

| Time | Compressive Strength (psi) | | | |
|---|---|---|---|---|
| (days) | 1B | 2B | 3 | 4B |
| 1 | 73 | 344 | 329 | 1272 |
| 3 | 123 | 535 | 386 | 1653 |

TABLE 15

Compressive Strength (UCA)

| Time | Compressive Strength (psi) | | |
|---|---|---|---|
| (hours) | 1B | 2B | 4B |
| 1 | 94 | 125 | 13 |
| 2 | 85 | 107 | 66 |
| 3 | 79 | 120 | 212 |
| 4 | 77 | 142 | 332 |
| 5 | 79 | 167 | 429 |
| 6 | 85 | 192 | 531 |
| 7 | 91 | 218 | 608 |
| 8 | 97 | 237 | 669 |
| 9 | 103 | 256 | 731 |
| 10 | 109 | 272 | 772 |
| 11 | 113 | 287 | 812 |
| 12 | 119 | 302 | 850 |
| 13 | 123 | 310 | 884 |
| 14 | 127 | 317 | 923 |
| 15 | 130 | 327 | 952 |
| 16 | 133 | 337 | 982 |
| 17 | 136 | 341 | 1006 |
| 18 | 140 | 350 | 1029 |
| 19 | 140 | 355 | 1060 |
| 20 | 143 | 364 | 1080 |
| 21 | 146 | 368 | 1104 |
| 22 | 149 | 377 | 1131 |
| 23 | 150 | 381 | 1149 |
| 24 | 151 | 392 | 1174 |

The results show that the volcanic ash-containing cement compositions demonstrated good rheology, no free fluid, and good thickening time, and accordingly were suitable for pumping. The results also showed that the low-density cement compositions demonstrated compressive strengths in the range of hundreds of psi and accordingly were suitable, for example, for shallow section applications in oil and gas wells.

Embodiments

Certain embodiments of the present disclosure are provided in the following list:

Embodiment 1. A cement composition, comprising
  about 10 wt % to about 85 wt % of Portland cement; and
  about 10% by weight of cement (BWOC) to about 70% BWOC of volcanic ash.

Embodiment 2. The cement composition of embodiment 1, wherein the volcanic ash comprises Saudi Arabian volcanic ash.

Embodiment 3. The cement composition of embodiment 1 or embodiment 2, wherein the Portland cement comprises an American Petroleum Institute (API) Class G cement.

Embodiment 4. The cement composition of any one of embodiments 1-3, comprising about 20% to about 60% BWOC of volcanic ash.

Embodiment 5. The cement composition of any one of embodiments 1-3, comprising about 30% to about 50% BWOC of volcanic ash.

Embodiment 6. The cement composition of any one of embodiments 1-3, comprising
  about 10 wt % to about 60 wt % of Portland cement;
  about 10% BWOC to about 70% BWOC of volcanic ash; and
  about 25 wt % to about 80 wt % of water.

Embodiment 7. The cement composition of any one of embodiments 1-3, comprising about 15 wt % to about 45 wt % of Portland cement;
about 10% BWOC to about 70% BWOC of volcanic ash; and
about 30 wt % to about 65 wt % of water.

Embodiment 8. The cement composition of embodiment 6 or embodiment 7, wherein a weight ratio of water to a total amount of Portland cement and volcanic ash present in the composition is about 0.1:1 to about 4:1.

Embodiment 9. The cement composition of embodiment 6 or embodiment 7, wherein a weight ratio of water to a total amount of Portland cement and volcanic ash present in the slurry is about 0.4:1 to about 2:1.

Embodiment 10. The cement composition of any one of embodiments 6-9, further comprising an extender.

Embodiment 11. The cement composition of embodiment 10, comprising about 0.1% BWOC to about 20% BWOC of the extender.

Embodiment 12. The cement composition of any one of embodiments 6-11, further comprising a defoamer.

Embodiment 13. The cement composition of embodiment 12, comprising about 0.01% BWOC to about 2% BWOC of the defoamer.

Embodiment 14. The cement composition of any one of embodiments 6-13, further comprising a gelling agent.

Embodiment 15. The cement composition of embodiment 14, comprising about 0.1% BWOC to about 5% BWOC of the gelling agent.

Embodiment 16. The cement composition of any one of embodiments 6-15, further comprising a retarder.

Embodiment 17. The cement composition of embodiment 16, comprising about 0.01% BWOC to about 3% BWOC of the retarder.

Embodiment 18. The cement composition of any one of embodiments 6-17, having a density of about 60 pcf to about 150 pcf.

Embodiment 19. The cement composition of any one of embodiments 6-17, having a density of about 75 pcf to about 120 pcf.

Embodiment 20. The cement composition of any one of embodiments 6-19, having a thickening time of about 3 hours to about 8 hours at about 120° F. and about 2,700 psi.

Embodiment 21. The cement composition of any one of embodiments 6-19, having a thickening time of about 4 hours to about 7 hours at about 120° F. and about 2,700 psi.

Embodiment 22. The cement composition of any one of embodiments 6-21, having a compressive strength of about 50 psi to about 1,500 psi after curing for about 1 day at about 150° F.

Embodiment 23. The cement composition of any one of embodiments 6-21, having a compressive strength of about 100 psi to about 2,000 psi after curing for about 3 days at about 150° F.

Embodiment 24. A cement composition, comprising
about 10 wt % to about 60 wt % of Portland cement;
about 10% BWOC to about 70% BWOC of volcanic ash;
about 0.01% BWOC to about 2% BWOC of a defoamer;
about 0.1% BWOC to about 5% BWOC of a gelling agent;
about 0.1% BWOC to about 3% BWOC of a retarder; and
about 25 wt % to about 80 wt % of water.

Embodiment 25. The cement composition of embodiment 24, further comprising about 0.1% BWOC to about 5% BWOC of an extender.

Embodiment 26. The cement composition of embodiment 25, wherein the extender comprises bentonite.

Embodiment 27. A cement composition, comprising
about 10 wt % to about 60 wt % of Portland cement;
about 10% BWOC to about 70% BWOC of volcanic ash;
about 5% BWOC to about 20% BWOC of an extender;
about 0.01% BWOC to about 2% BWOC of a defoamer; and
about 25 wt % to about 80 wt % of water.

Embodiment 28. The cement composition of embodiment 27, wherein the extender comprises sodium silicate.

Embodiment 29. A method of cementing a wellbore, comprising
providing the cement composition of embodiment 6 to the wellbore, and
curing the composition.

Embodiment 30. The method of embodiment 29, comprising pumping the cement composition into an annulus between the wellbore and a casing in the wellbore.

Other implementations are also within the scope of the following claims.

The invention claimed is:

1. A cement composition, comprising:
about 10 wt % to about 45 wt % of Portland cement;
about 30% by weight of cement (BWOC) to about 50% BWOC of volcanic ash, wherein the volcanic ash comprises about 75 wt % silicon dioxide ($SiO_2$); and
about 25 wt % to about 80 wt % of water;
wherein a weight ratio of water to a total amount of Portland cement and volcanic ash present in the cement composition is about 0.4:1 to about 2:1; and
the cement composition has no free fluid.

2. The cement composition of claim 1, wherein the volcanic ash comprises Saudi Arabian volcanic ash.

3. The cement composition of claim 1, wherein the Portland cement comprises an American Petroleum Institute (API) Class G cement.

4. The cement composition of claim 1, comprising about 30% BWOC to about 45% BWOC of volcanic ash.

5. The cement composition of claim 1, comprising about 40% BWOC of volcanic ash.

6. The cement composition of claim 1, comprising
about 15 wt % to about 45 wt % of Portland cement; and about 30 wt % to about 65 wt % of water.

7. The cement composition of claim 1, further comprising an extender.

8. The cement composition of claim 7, comprising about 0.1% BWOC to about 20% BWOC of the extender.

9. The cement composition of claim 1, further comprising a defoamer.

10. The cement composition of claim 9, comprising about 0.01% BWOC to about 2% BWOC of the defoamer.

11. The cement composition of claim 1, further comprising a gelling agent.

12. The cement composition of claim 11, comprising about 0.1% BWOC to about 5% BWOC of the gelling agent.

13. The cement composition of claim 1, further comprising a retarder.

14. The cement composition of claim 13, comprising about 0.01% BWOC to about 3% BWOC of the retarder.

15. The cement composition of claim 1, having a density of about 80 pcf to about 120 pcf.

16. The cement composition of claim 1, having a density of about 80 pcf to about 105 pcf.

17. The cement composition of claim 1, having a thickening time of about 3 hours to about 8 hours at about 120° F. and about 2,700 psi.

18. The cement composition of claim 1, having a thickening time of about 4 hours to about 7 hours at about 120° F. and about 2,700 psi.

19. The cement composition of claim 1, having a compressive strength of about 50 psi to about 1,500 psi after curing for about 1 day at about 150° F.

20. The cement composition of claim 1, having a compressive strength of about 100 psi to about 2,000 psi after curing for about 3 days at about 150° F.

21. A cement composition, comprising:
   about 10 wt % to about 45 wt % of Portland cement;
   about 30% BWOC to about 50% BWOC of volcanic ash, wherein the volcanic ash comprises about 75 wt % silicon dioxide ($SiO_2$);
   about 0.01% BWOC to about 2% BWOC of a defoamer;
   about 0.1% BWOC to about 5% BWOC of a gelling agent;
   about 0.1% BWOC to about 3% BWOC of a retarder; and
   about 25 wt % to about 80 wt % of water;
wherein a weight ratio of water to a total amount of Portland cement and volcanic ash present in the cement composition is about 0.4:1 to about 2:1; and
   the cement composition has no free fluid.

22. The cement composition of claim 21, further comprising about 0.1% BWOC to about 5% BWOC of an extender.

23. The cement composition of claim 22, wherein the extender comprises bentonite.

24. A cement composition, comprising:
   about 10 wt % to about 45 wt % of Portland cement;
   about 30% BWOC to about 50% BWOC of volcanic ash, wherein the volcanic ash comprises about 75 wt % silicon dioxide ($SiO_2$);
   about 5% BWOC to about 20% BWOC of an extender;
   about 0.01% BWOC to about 2% BWOC of a defoamer;
   about 25 wt % to about 80 wt % of water;
wherein a weight ratio of water to a total amount of Portland cement and volcanic ash present in the cement composition is about 0.4:1 to about 2:1; and
   the cement composition has no free fluid.

25. The cement composition of claim 24, wherein the extender comprises sodium silicate.

26. A method of cementing a wellbore, comprising
   providing the cement composition of claim 1 to the wellbore, and
   curing the cement composition.

27. The method of claim 26, comprising pumping the cement composition into an annulus between the wellbore and a casing in the wellbore.

* * * * *